United States Patent
Gramm

(10) Patent No.: US 7,310,931 B2
(45) Date of Patent: Dec. 25, 2007

(54) HEIGHT SENSOR ARRANGEMENT FOR AGRICULTURAL APPLICATIONS

(75) Inventor: Richard Gramm, 3529 Fir Rd., Bremen, IN (US) 46506

(73) Assignee: Richard Gramm, Bremen, IN (US)

( * ) Notice: Subject to any disclaimer, the term of this patent is extended or adjusted under 35 U.S.C. 154(b) by 0 days.

(21) Appl. No.: 10/901,824

(22) Filed: Jul. 29, 2004

(65) Prior Publication Data

US 2005/0028504 A1    Feb. 10, 2005

Related U.S. Application Data

(63) Continuation-in-part of application No. 10/634,929, filed on Aug. 5, 2003, now Pat. No. 6,883,299.

(51) Int. Cl.
*A01D 67/00* (2006.01)

(52) U.S. Cl. .................................................... 56/208

(58) Field of Classification Search ..... 56/10.2 A–10.2 E, 10.2 R, 17.1, 17.2, 121.46, 51, 94, 73, 56/84, DIG. 3, DIG. 10; 172/2–8
See application file for complete search history.

(56) References Cited

U.S. PATENT DOCUMENTS

| | | | | |
|---|---|---|---|---|
| 3,196,599 A | * | 7/1965 | Meiners et al. | 56/10.2 E |
| 3,398,516 A | * | 8/1968 | Quick | 56/208 |
| 4,147,016 A | * | 4/1979 | Jensen et al. | 56/15.8 |
| 4,199,925 A | * | 4/1980 | Quick et al. | 56/208 |
| 4,942,724 A | * | 7/1990 | Diekhans et al. | 56/10.4 |
| 5,577,373 A | * | 11/1996 | Panoushek et al. | 56/10.2 E |
| 5,713,190 A | * | 2/1998 | Vermeulen et al. | 56/10.2 E |
| 6,041,583 A | * | 3/2000 | Goering et al. | 56/10.2 E |
| 6,516,595 B2 | * | 2/2003 | Rhody et al. | 56/10.2 E |
| 6,530,197 B1 | * | 3/2003 | Christensen et al. | 56/10.2 E |
| 2002/0069628 A1 | * | 6/2002 | Metzger | 56/10.2 E |
| 2003/0140609 A1 | * | 7/2003 | Beaujot | 56/10.2 E |

FOREIGN PATENT DOCUMENTS

JP         2004229560 A   *   8/2004

* cited by examiner

*Primary Examiner*—Árpád Fábián Kovács
(74) *Attorney, Agent, or Firm*—Wildman, Harrold, Allen & Dixon, LLP

(57) ABSTRACT

A curved arm coupled to a rotating shaft in a sensor for detecting the height of an apparatus, such as used in agriculture, traveling over the ground is comprised entirely of a high strength, lightweight, flexible and resilient elastomeric material such as thermoplastic polyurethane. An upper end of the sensor arm is attached to the shaft, while a lower portion of the arm engages the soil and undergoes vertical displacement as it traverses irregular terrain. The height of the apparatus above the soil is measured in terms of the rotational displacement of the shaft. The strength, flexibility and resiliency of the sensor arm allows it to withstand large applied forces. As the arm traverses the soil and engages various obstructions such as ruts, terraces, rocks, roots, etc., it undergoes deflection (in all directions), twisting, compression and stretching, yet assumes its original configuration, size and shape to provide accurate height measurements.

9 Claims, 13 Drawing Sheets

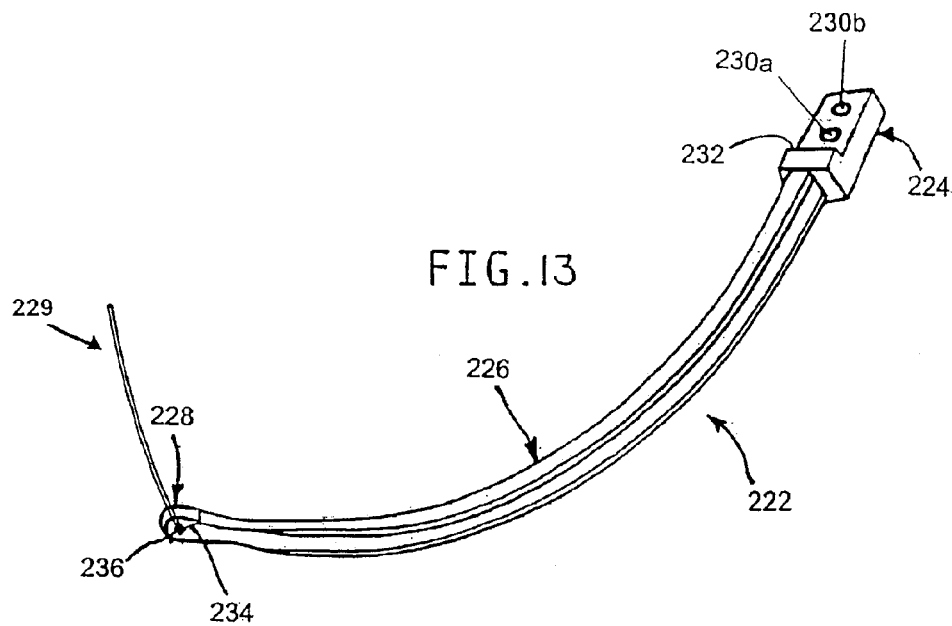
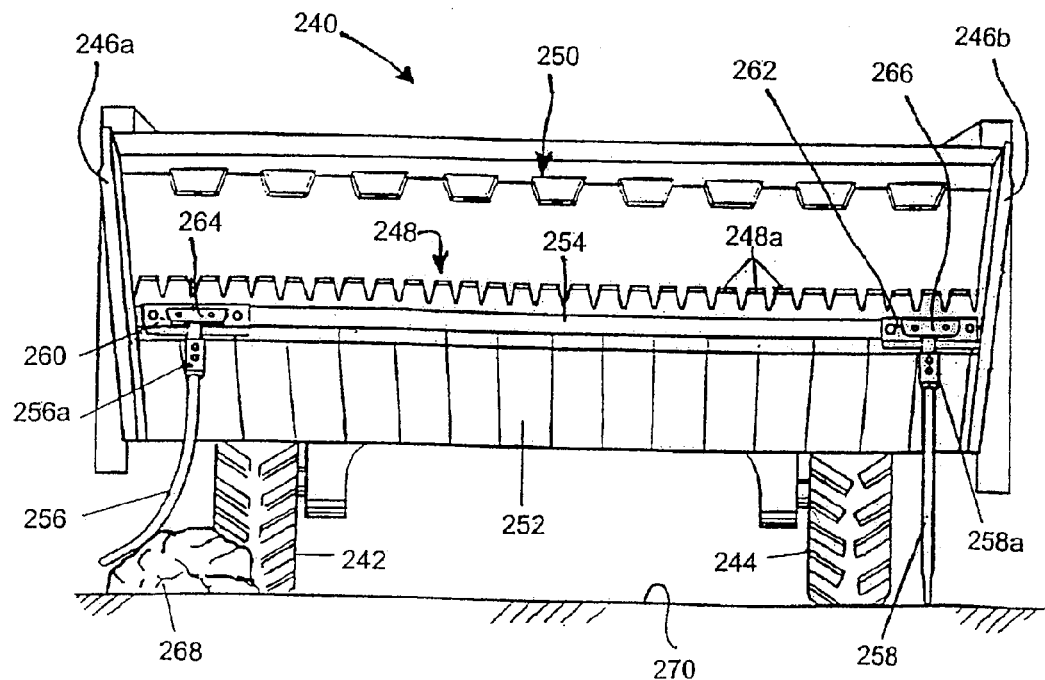

HEIGHT SENSOR ARRANGEMENT FOR AGRICULTURAL APPLICATIONS

CROSS REFERENCE TO RELATED APPLICATIONS

This application is a continuation-in-part of U.S. patent application Ser. No. 10/634,929 filed on Aug. 5, 2003 now U.S. Pat. No. 6,883,299.

FIELD OF THE INVENTION

This invention relates generally to a sensor for detecting the height above the soil of a moving vehicle such as a harvesting machine, and is particularly directed to a ground height sensor having a curved ground-engaging arm comprised entirely of a high strength, lightweight, flexible and resilient elastomeric material capable of undergoing large deformation upon impact with obstructions and irregularities in the soil and assuming its original shape and configuration.

BACKGROUND OF THE INVENTION

A common approach to crop harvesting involves the use of a combine having a header on its forward portion for engaging and removing the crop from a field. The header is maintained a designated height above the soil as determined by the type of crop and various operating conditions. Operating with the header too high will result in failure to harvest all of the crop, while operating too close to the soil increases the possibility of damage to the header by impact with rocks and other obstructions in the soil. With the use of longer headers spanning wider tracts, the possibility of impact of the header with the soil and consequent damage to the header and/or combine has correspondingly increased.

Various types of height sensors are used to maintain the harvesting machine a designated height above the soil for optimum crop recovery. Most current height sensors employ a ground-engaging arm suspended from the header and extending rearwardly relative to the direction of travel. A cutter assembly is located in a bottom portion of the header housing forward of the height sensor arm. Thus, the sensor arm provides information regarding vertical separation between the cutter assembly and the soil with respect to soil the cutter assembly has already passed over. The inability to sense and provide information regarding terrain in front of the header limits the accuracy of the height control signals provided by the height sensor. Moreover, as the header gets closer to the ground, current sensor arms engage the ground even further aft of the cutter assembly thus increasing the separation between the position of the cutter assembly and the location of the soil the height of which is actually being detected.

The height sensor is typically includes a thin rod extending rearwardly and engaging the soil. These sensor arms are subjected to large forces. For example, a downwardly force is applied to the sensor arm to ensure that its distal end engages the soil. This downward force is of sufficient magnitude to allow the arm to penetrate plant residue in order to contact the soil. In addition, crop rows are frequently curvilinear to accommodate terrain contour. Harvesting curvilinear crop rows results in the application of large lateral forces on the sensor arm. The capability of combines, which incorporate rear steering, to rapidly turn and change direction increases the likelihood of sensor arm damage caused by the application of large lateral forces. In addition, field terracing wherein upraised strips of soil or elongated shallow depressions, or ditches, in the soil are formed in a spaced manner over a field are increasingly used to reduce erosion. Traversing these upraised strips of soil or spaced depressions also subjects the height sensor arm to large forces while placing greater demands on sensing and reacting to changes in soil elevation to avoid damage to harvesting machinery. Also, in an attempt to maximize crop recovery, harvesting headers are increasingly being employed at lower heights above the soil with increased force being applied to the height sensor arm. All of these factors tend to increase the likelihood of damage to the height control sensor resulting in harvester down time and production losses.

Header height control sensors are generally not designed with the configuration of existing headers as a primary consideration. Thus, the typical header height sensor is not adapted for retrofitting on an existing header without header modification. For example, one current soil height sensor employs a pair of pivotally connected curved arms mounted to a lower portion of the header housing. In order to accommodate this multi-section height sensor arm, the lower surface of the header housing is provided with a recessed portion to receive the arm sections for storage and protection of the arms from damage when not in use. Not all harvester heads are provided with these height sensor arm storage recesses, thus, limiting the use of this type of sensor arm to headers having these recesses.

The present invention addresses the aforementioned limitations of the prior art by providing a height sensor arrangement particularly adapted for use in agricultural applications such as on a harvester, which provides an increasingly early warning of upraised soil about to be traversed by the harvester as its height above the soil is reduced. The height sensor includes a curved ground-engaging arm comprised entirely of a high strength, lightweight, flexible and resilient elastomeric material, such as thermoplastic polyurethane, capable of withstanding very large deformation forces without failing and assuming its original shape and configuration for continued reliable height sensing performance.

OBJECTS AND SUMMARY OF THE INVENTION

Accordingly, it is an object of the present invention to provide a sensor arm for a height detector such as used in agricultural equipment components which is reliable, lightweight and highly resistant to various extreme environmental conditions as well as large impact forces arising from contact with the soil or obstructions in or on the soil.

It is another object of the present invention to provide a flexible arm for a height sensor for use in a combine header which is equally well adapted for use on a corn header having a recessed lower portion or on a header having a flat bottom skid plate.

Yet another object of the present invention is to provide a flexible arm for use in an agricultural height sensor for detecting the height of an agricultural implement above the soil which is capable of undergoing extreme bending, or deformation, in any direction and then assuming its original shape and configuration for continuing to provide accurate implement height information.

A further object of the present invention is to provide a curved height sensor arm for use in agricultural applications which is flexible, lightweight, resilient and easily installed using existing hardware on current harvesting headers for use with various crops and has an extended operating lifetime.

It is another object of the present invention to provide a height sensor for an agricultural implement traversing a field which increases the time between detection and traversal of high points in the soil by the crop engaging mechanism to facilitate implement height adjustment and the avoidance of impact with the soil.

Yet another object of the present invention is to provide a curved arm for a ground height sensor which is of high strength and rugged, is flexible allowing the sensor to be lowered to the ground without damaging or breaking the arm, and engages the ground at a point along its length which moves forward in the direction of travel as the height sensor is lowered to provide an earlier warning of contact with upraised portions of the ground.

Still another object of the present invention is to provide a ground height sensor particularly adapted for agricultural applications, such as for use on a harvester of the combine header type, which can be easily mounted using conventional hardware at a location forward of or adjacent to the header's crop engaging mechanism.

A further object of the present invention is to provide a ground height sensor for use in a combine header which is easily installed on either end or on an inner portion of a header anywhere along its length without requiring modification of the header.

The present invention contemplates a sensor arm for measuring the height above the soil of an agricultural implement. The sensor arm comprises: an elongated, curved, flexible member formed entirely of an elastomeric material, wherein the elongated member is bendable in any direction and capable of assuming its original shape and configuration following bending; and a mounting arrangement integrally formed in and disposed on one end of the elongated member for securely attaching the elongated member to the agricultural implement.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 13 is a perspective view of an improved height sensor arm in accordance with the present invention;

FIG. 14 is a front plan view of an agricultural header incorporating a pair of improved height sensor arms as shown in FIG. 13 illustrating the lateral deflection of one of the sensor arms upon impact with an obstruction in a field being traversed by the header;

DETAILED DESCRIPTION OF THE PREFERRED EMBODIMENTS

Figure 1:
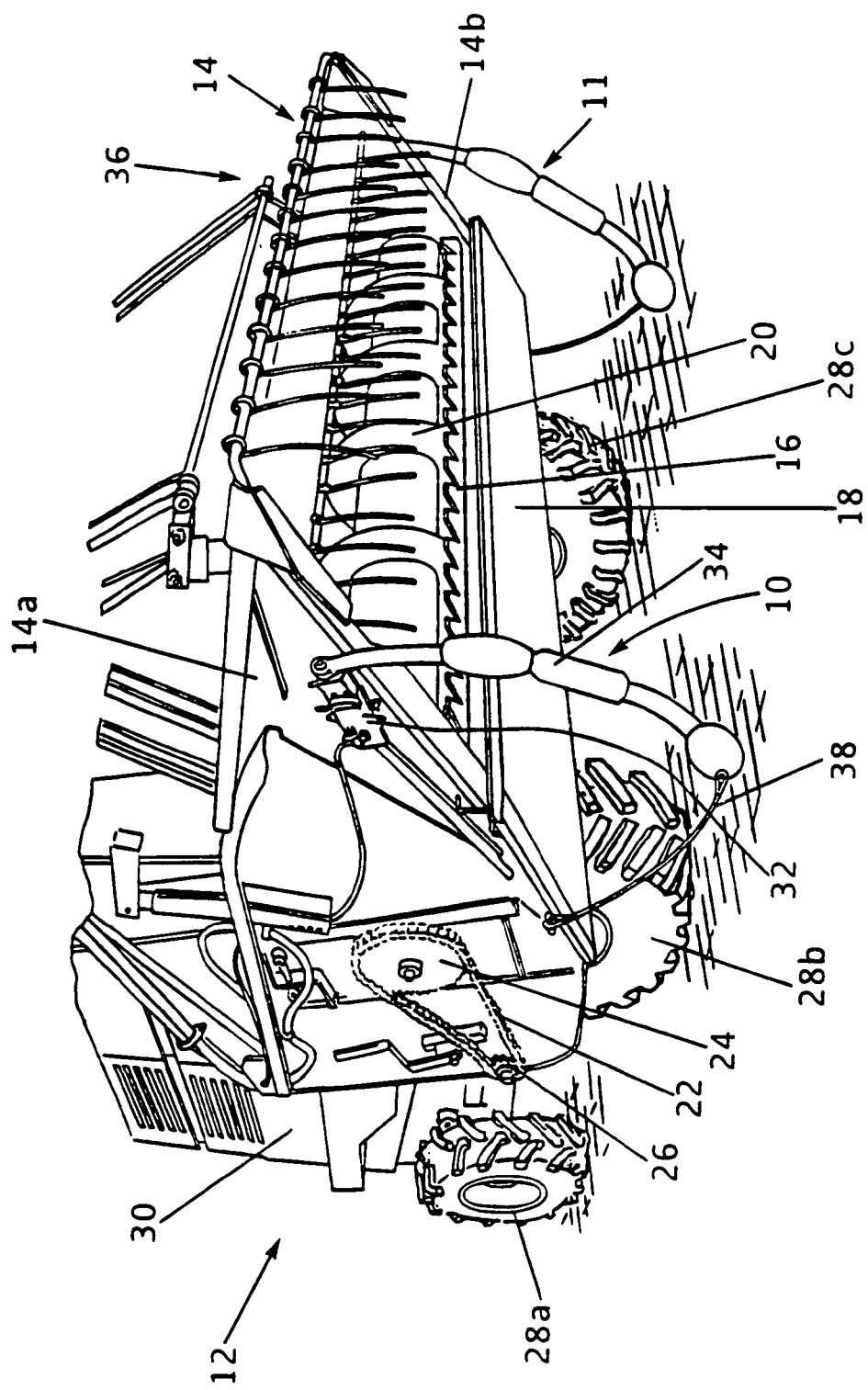
FIG. 1 is a partial front perspective view of a combine with an attached header incorporating a height sensor in accordance with the principles of the present invention.

Referring to FIG. 1, there is shown a partial front perspective view of a height sensor arrangement 10 for use on a header 14 attached to a forward portion of a combine 12. Combine 12 is conventional in design and operation and includes a chassis 30 disposed on and supported by four wheels, three of which are shown in the figure as elements 28a, 28b and 28c. An operator is positioned within a cabin disposed in the chassis. Also disposed within the chassis are a means for propulsion and various grain processing stages as well as a storage bin for temporarily storing grain separated from plants ingested by the header. These portions of combine 12 are conventional and are not part of the present invention and are thus not shown in FIG. 1. Header 14 is also conventional in design and operation and includes a crop gathering unit 36 (partially shown in the figure) used in the harvesting of various grains. Header 14 also includes an elongated housing oriented generally at 90° relative to the direction of travel of the combine during harvesting.

Header 14 includes first and second end panels 14a and 14b. While only one header section is shown attached to a forward portion of combine 12 in FIG. 1, plural header sections attached by means of their respective end panels may be connected together and mounted to a forward portion of the combine to provide a wide harvesting path. Typically attached to an upper portion of header 14 is a crop engaging/gathering mechanism 36 for directing the severed plant residue into the combine for processing, with only a portion of this mechanism shown in FIG. 1 because it does not form a part of the present invention. Shown respectively attached to the first and second header end panels 14a, 14b are first and second height sensor arrangements 10 and 11 which are similar in operation and configuration as they embody the principles of the present invention. Extending lengthwise along the header 14 is an auger 20 also oriented generally transverse to the direction of travel of the combine 12. Auger 20 is rotationally displaced by means of a combination of a driven sprocket 24, a drive chain 22 and a drive sprocket 26 which is rotationally displaced by the combine's engine (not shown). Auger 20 is provided with a pair of complementary spiral sections which direct grain and plant residue taken in by the header 14 toward the center of the header housing where it is directed aft into the combine's feederhouse (not shown) for processing within the combine. The bottom of the header 14 is provided with a skid plate 18 extending the length of the header housing which is adapted to engage and ride over upraised portions of uneven soil. Disposed adjacent a forward portion of the skid plate 18 is a cutterbar 16 which operates in a reciprocating manner to sever the upper portion of plants engaged by the header 14 as the combine 12 traverses a field. The thus severed plants, with grain attached thereto, are directed into the header's transverse auger 20 for processing as described above.

Because the first and second height sensor arrangements 10 and 11 are similar in operation and configuration, only the first height sensor arrangement will be described in detail for simplicity. The first height sensor arrangement 10 includes a curved, flexible arm 34 having a first proximal end and a second, opposed distal end. The height sensor arrangement 10 further includes a sensor mechanism 32 mounted to the header's first end panel 14a and attached to the proximal end of arm 34 for supporting the arm in a suspending manner. Sensor mechanism 32 is described in detail below. The distal end of arm 34 is attached to an aft portion of header 14 by means of a high strength connecting cable 38 which is preferably comprised of steel. Connecting cable 38 prevents damage to the sensor arm 34 in the event the combine 12 is reversed in direction.

Figure 2:
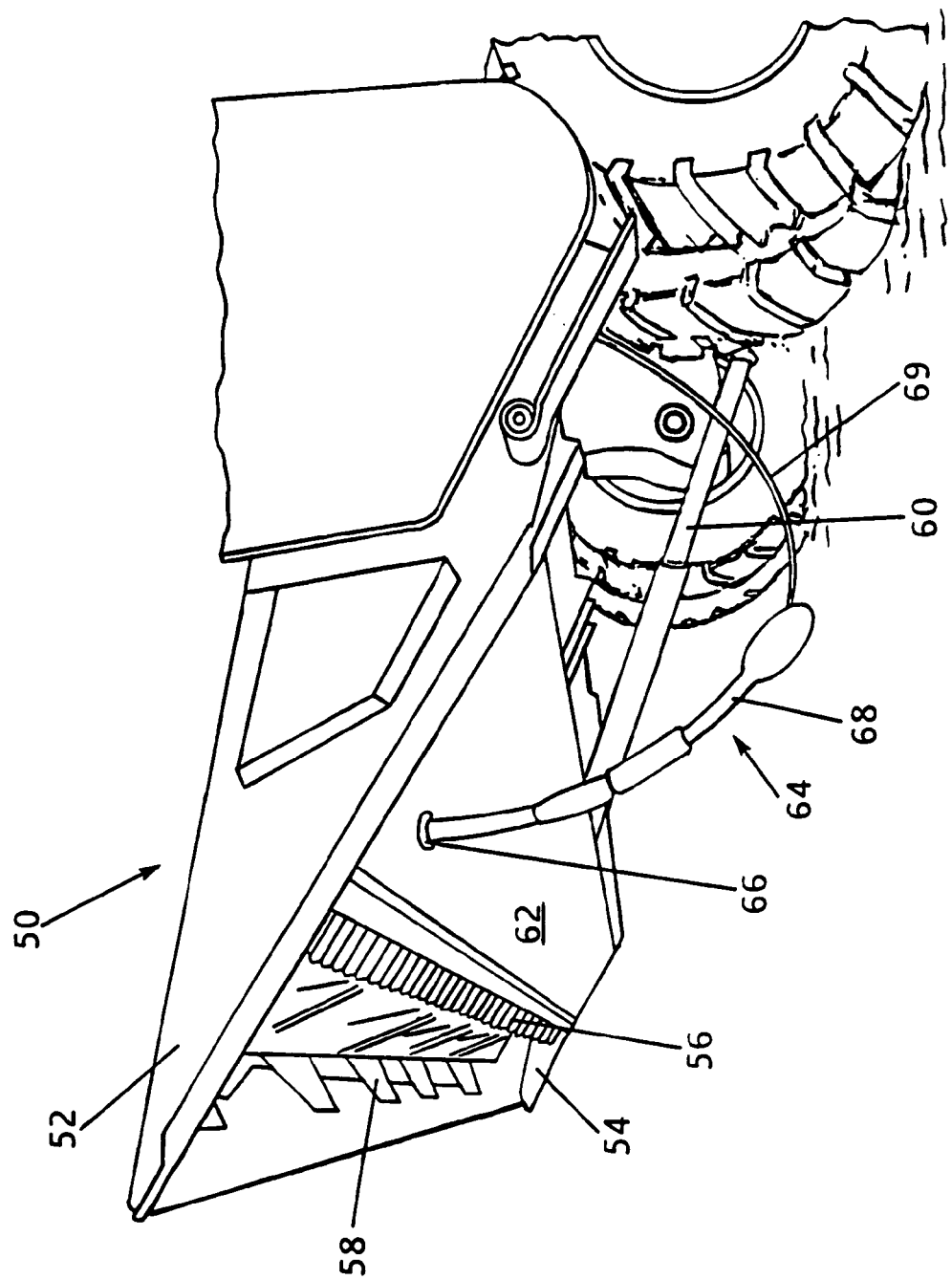
FIG. 2 is a partial perspective view of a lower portion of a combine header illustrating the mounting of a height sensor on a inner, lower portion of the header in accordance with another aspect of the present invention.

Referring to FIG. 2, there is shown another embodiment of a height sensor arrangement 64 in accordance with the principles of the present invention. As in the previously described embodiment, height sensor arrangement 64 is attached to a header 50 having first and second end panels 52 and 54 as well as a crop gathering unit 58 attached to an upper portion of the header. A cutterbar assembly 56 is disposed in a lower, forward portion of the header 50 immediately forward of a skid plate 62 forming the bottom portion of the header. In the embodiment shown in FIG. 2, the height sensor arrangement 64 is attached to and suspended from the header's skid plate 62 by means of a mounting assembly 66 described in detail below. As in the previously described embodiment, the height sensor arrangement 64 includes a curved, flexible arm 68 and a connecting cable 69 coupling a distal end of the arm to an aft portion of the header 50. A hydraulic cylinder 60 is connected between the header 50 and the combine for raising and lowering the header between a nonuse position and a use position and for changing the height of the header above the soil in accordance with output signals from the height sensor arrangement of the present invention.

Figure 3:
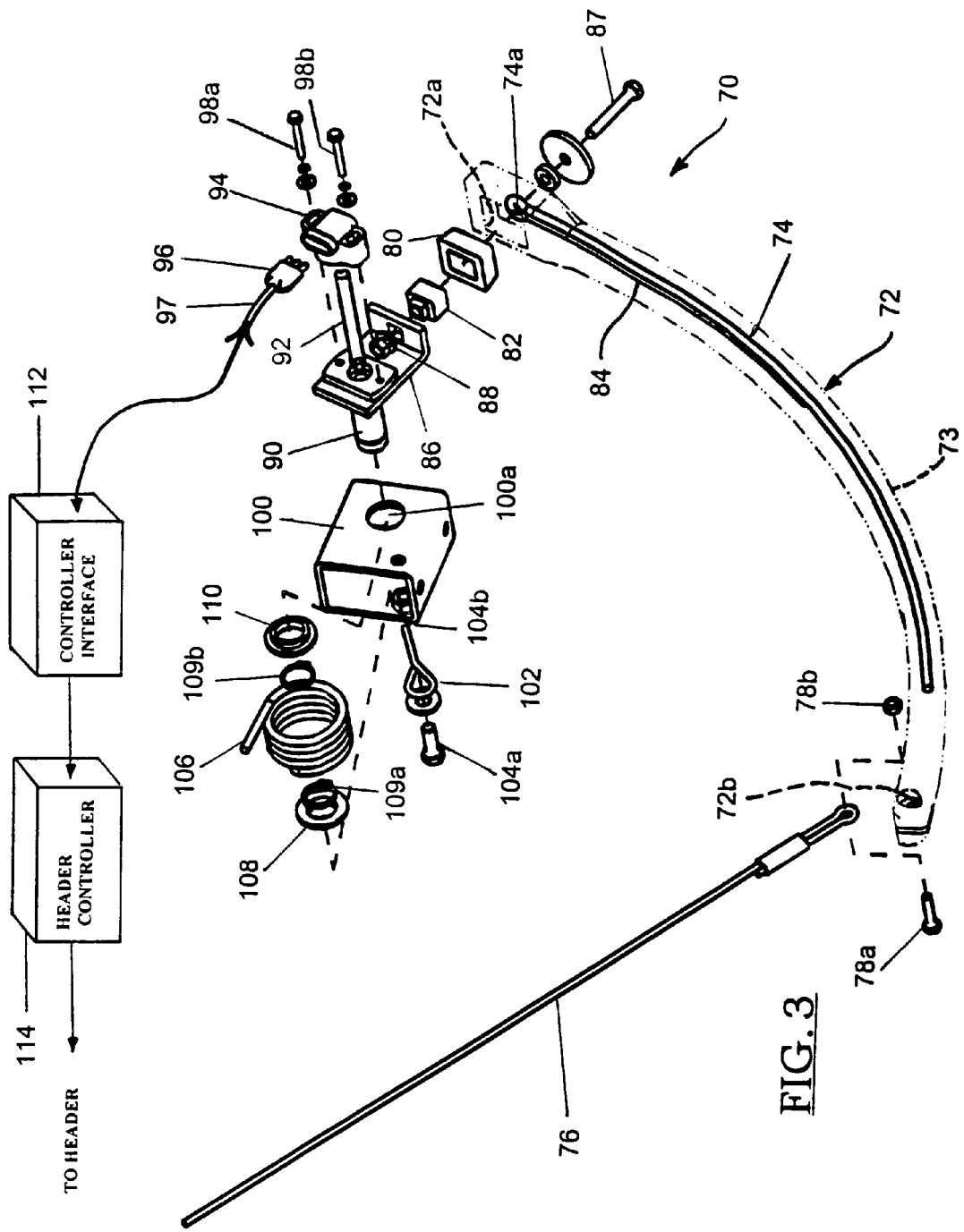
FIG. 3 is an exploded perspective view of one embodiment of a height sensor in accordance with the present invention.
Figure 4:
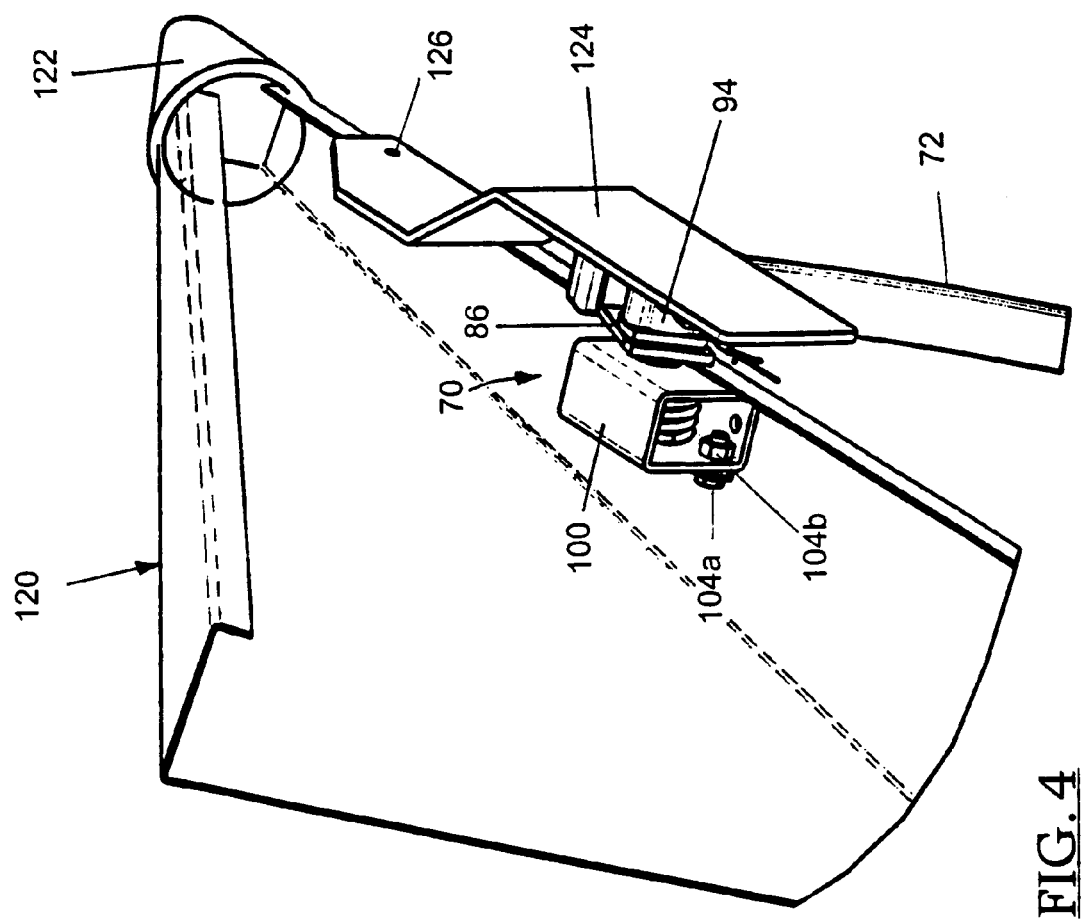
FIG. 4 is a perspective view illustrating details of the manner in which the height control sensor shown in FIG. 4 is attached to a combine header.
Figure 5:
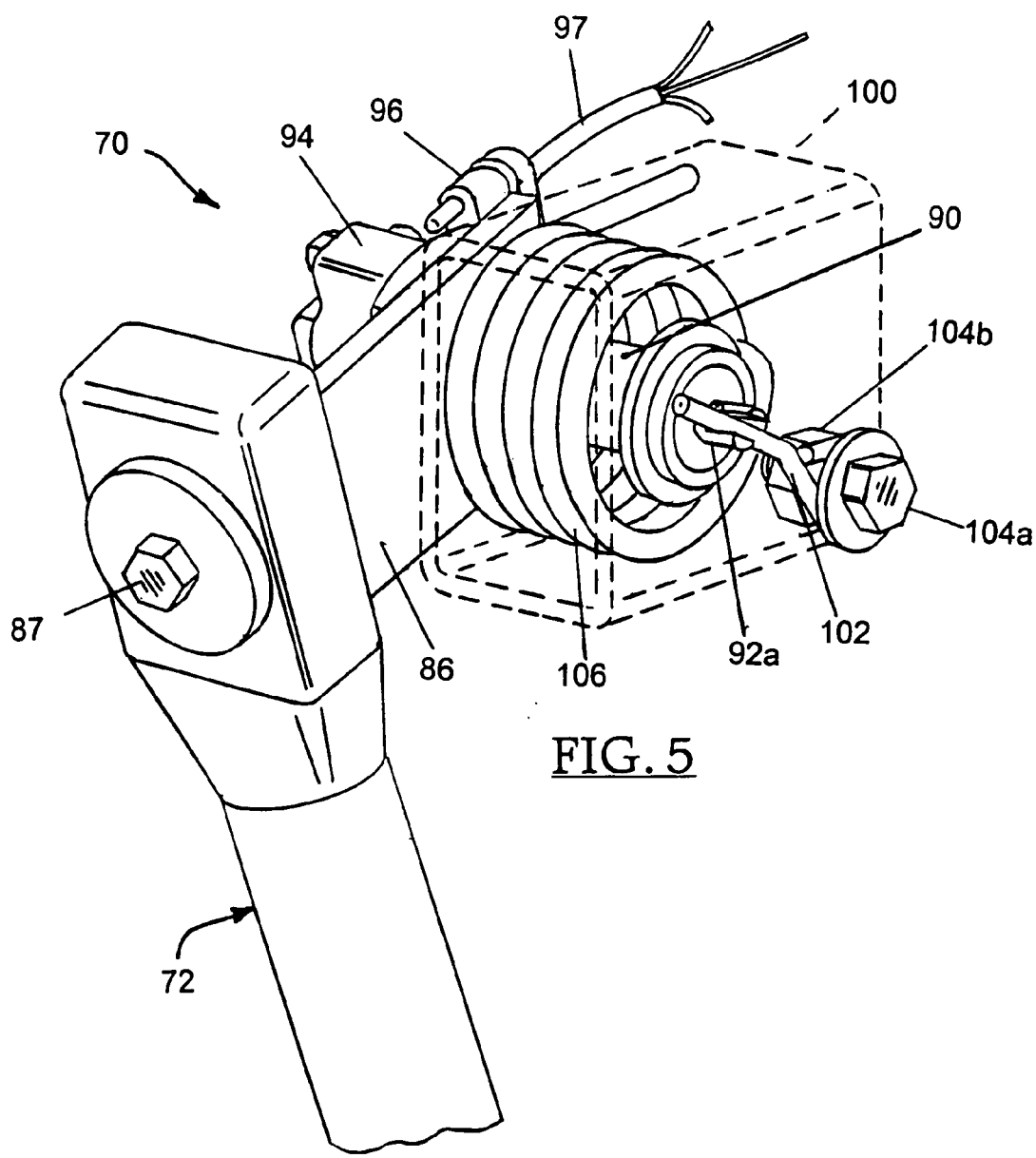
FIG. 5 is a partial perspective view shown partially in phantom illustrating additional details of the inventive height sensor.

Referring to FIG. 3, there is shown an exploded perspective view of a height sensor arrangement 70 in accordance with another embodiment of the present invention. FIG. 4 is a perspective view of the height sensor arrangement 70 as installed on a header crop divider 120, while FIG. 5 is a perspective view of the height sensor arrangement in assembled form. The height sensor arrangement 70 shown in FIG. 3 is adapted for attachment to a side panel of a header as shown for the case of height sensor arrangements 10 and 11 in FIG. 1. Height sensor arrangement 70 includes an elongated, curved flexible arm 72 having an outer elastomeric sheath 73 shown in dotted line form in the figure and an inner high strength spring steel shaft 74 which is capable of flexing. Elastomeric sheath 73 protects arm 72 by absorbing high energy impact forces exerted on the arm such as when it engages an obstruction such as a rock or root in the field. Extending from a first end of the arm 72 and disposed within the outer elastomeric sheath 73 and connected to the spring steel shaft 74 such as by weldments is a metal reinforcing member 84 which provides the arm 72 with very high strength particularly, with respect to lateral forces. The combination of shaft 74 and reinforcing member 84 may also be formed by bending the shaft back upon itself and positioning the curved bent-back portion in closely spaced relation to the proximal end of the shaft as in the embodiment shown in FIG. 3. Each of the elastomeric sheath 73, shaft 74 and reinforcing member 84 is provided with the same radius of curvature along those portions of its respective length where it is in contact with one or more of the other two members, and none of these shaft members has a constant, fixed radius along its entire length. Each shaft member will assume its original curvature following removal of a force which changes its curvature. Arm 72 is flexible and has a curvilinear shape as shown in the figure for purposes which are discussed in detail below. One end of the spring steel shaft 74 is provided with an aperture 74a for installing the arm in the height sensor arrangement 70. A first proximal end of arm 72 is provided with a first end aperture 72a, while second opposed end of arm is provided with a second distal end aperture 72b. The second end aperture 72b is adapted for receiving the combination of a threaded member 78a and a nut 78b for attaching one end of the connecting cable 76 to the second distal end of the arm 72. The first end aperture 72a of the arm 72 is adapted to receive the combination of an elastomeric bushing 80 and an insert member 82. The insert member 82 is inserted within the elastomeric bushing 80 and includes an aperture extending therethrough. The aperture in the insert member 82 is adapted to receive a threaded member 87 which is also inserted through the aperture 74a in the end of the spring steel shaft 74 for attaching the proximal end of the arm 72 to a bracket 86. The proximal end of arm 72 is securely attached to bracket 86 by means of the combination of the threaded member 87 and a nut 88. Also attached to bracket 86 by means of first and second threaded members 98a and 98b is a rotation sensor 94. Rotation sensor 94 is electrically coupled to the combination of a header controller 114 and a controller interface 112 by means of the combination of an electrical connector 96 and one or more electrical leads 97.

Bracket 86 includes a circular aperture through which is inserted a fixed shaft 92. A first end of the fixed shaft 92 is attached to the rotation sensor 94, while a second opposed end of rotating shaft is connected to a sensor dial 102. Fixed shaft 92 is inserted in a cylindrically-shaped rotating shaft retainer 90. Shaft retainer 90 is inserted in an aperture 100a of a sensor housing 100. Disposed within sensor housing 100 is a torsion spring 106, with the torsion spring disposed about and connected to the shaft retainer 90 as both of these components are disposed within the sensor housing 100. Shaft retainer 90 extends through the sensor housing 100 and thus extends through aperture 100a as well as through a second aligned aperture in an opposing face of the sensor housing which is not shown in the figure for simplicity. A first combination of a bushing 108 and retaining ring 109a and a second combination of a bushing 110 and retaining ring 109b are disposed about the shaft retainer 90 in a spaced manner within the sensor housing 100 to maintain the shaft retainer within the housing while allowing the shaft retainer to freely rotate within the sensor housing. Retaining ring 109a is adapted for positioning within a first circumferential slot 90a within the rotating shaft retainer 90, while retaining ring 109b is adapted for positioning in a second circumferential slot (not shown in FIG. 3 for simplicity) for securely coupling the shaft retainer to housing 100 while allowing the shaft retainer to rotate. Also attached to the sensor housing 100 by means of the combination of a bolt 104a and a nut 104b is the aforementioned sensor dial 102. Sensor dial 102 is in the form of a thin, elongated pin-like structure which is wrapped around bolt 104a and freely rotatable about the bolt. One end of the sensor dial 102 is inserted into a notched end portion 92a of fixed shaft 92. In addition, one end of the torsion spring 106 is securely connected to the shaft retainer 90 within the sensor housing 100. By engaging the notched end portion 92a of the fixed shaft 92, sensor dial 102 securely maintains the fixed shaft in fixed position within the sensor housing 100 and establishes a zero elevation reference for the height sensor, which elevation reference point is adjustable. The elevation reference point may be easily changed by providing plural spaced apertures within housing 100, with each aperture adapted to receive the combination of bolt 104a and its associated nut 104b for changing the position of sensor dial 102 and the orientation at which it engages the end 92a of the fixed shaft 92. Shaft retainer 90 is freely rotatable on the fixed shaft 92 about which it is positioned. With the shaft retainer 90 attached to an end of the torsion spring 106, the torsion spring urges the shaft retainer to a given rotational position within the sensor housing 100. Rotational displacement of arm 72 which is attached to bracket 86 causes a corresponding rotational displacement of the combination of the shaft retainer 90. In the arrangement shown in FIG. 3, an inner portion of rotation sensor 94 is maintained fixed by the fixed shaft 92, while the sensor housing is allowed to rotate with the rotating shaft retainer 90 to provide an indication of the rotation of the sensor arm 72 about the axis of the shaft retainer within sensor housing 100. Rotation of shaft 90 is detected by the rotation sensor 94 which provides a corresponding signal via electrical connector 96 and lead(s) 97 to the controller interface 112 which, in turn, provides a signal to header controller 114. Header controller 114 is connected to the header for adjusting the height of the header in accordance with the rotation of sensor arm 72 as provided by the height sensor arrangement 70.

Figure 5A:
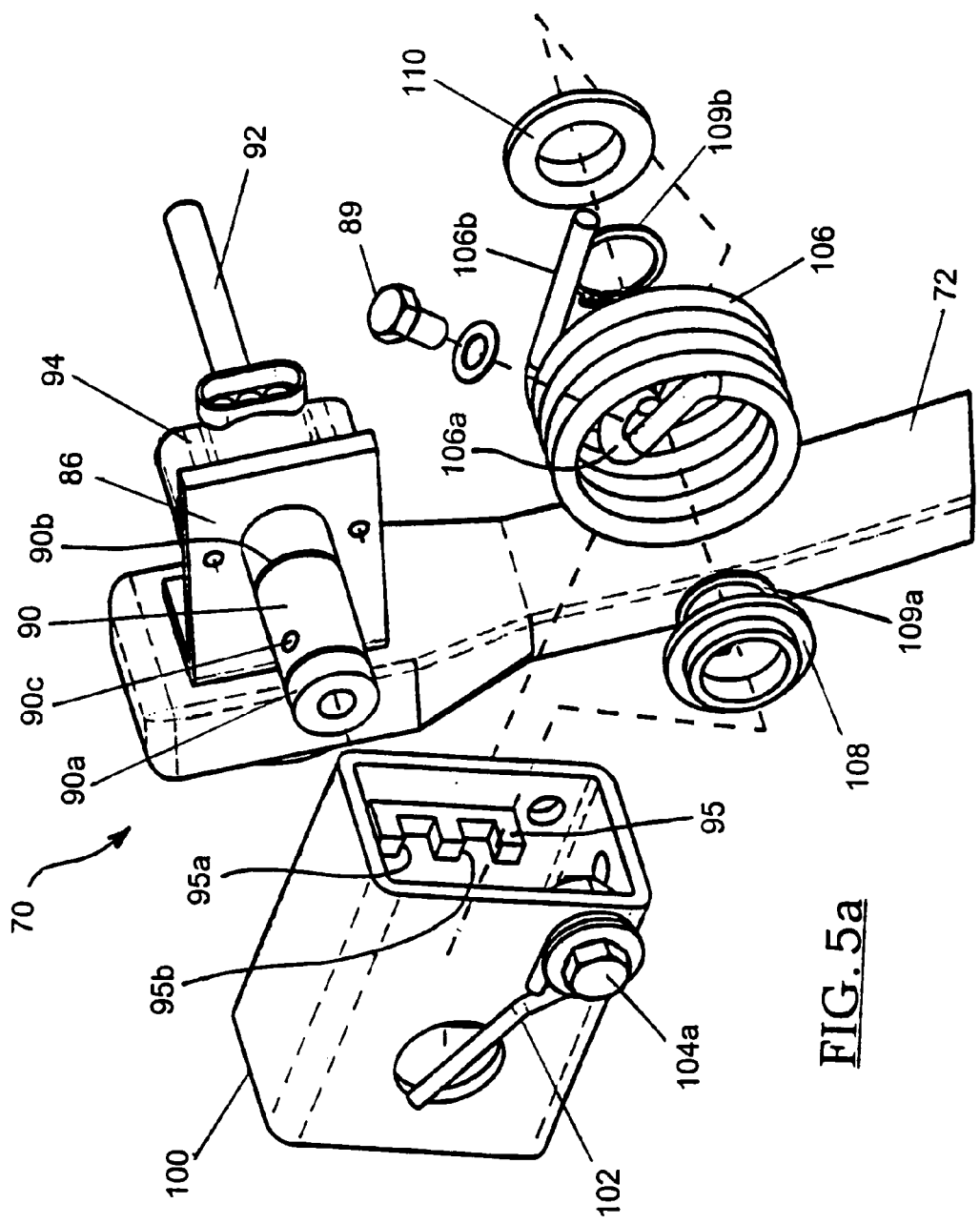
FIGS. 5a and 5b are respectively perspective exploded and assembled views of the height sensor of FIG. 5 which incorporates an adjustable feature for varying the downward, ground-engaging force exerted on the sensor arm.
Figure 5B:
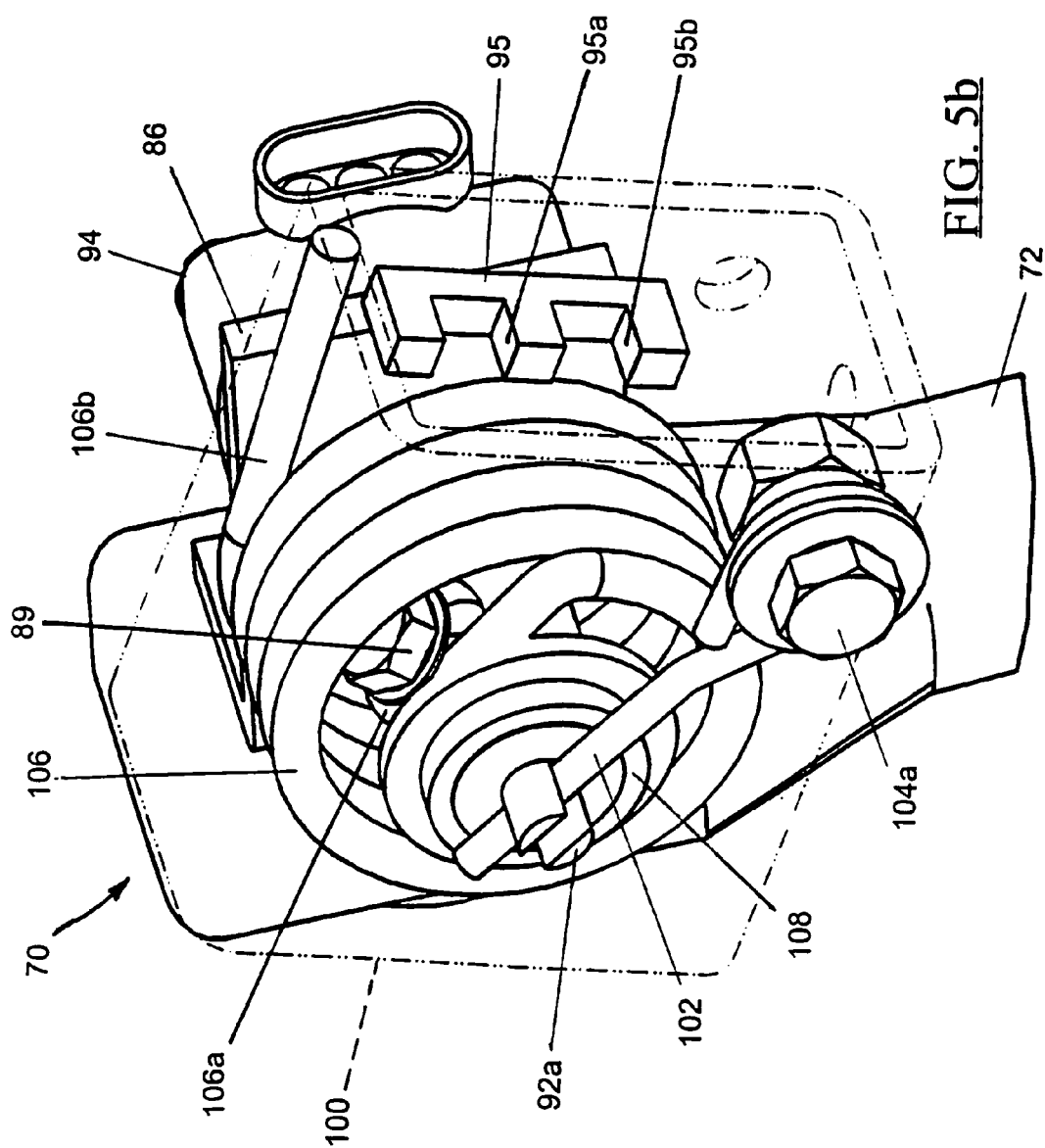

Referring to FIGS. 5a and 5b, there are respectively shown exploded and assembled perspective views illustrating additional details of the height sensor arrangement 70 shown in FIGS. 3, 4 and 5. As shown in FIGS. 5a and 5b, torsion spring 106 is attached to the shaft retainer 90 by means of a threaded pin 89, such as a bolt or screw, inserted through an inner portion 106a of the spring and into a threaded aperture 90c in a lateral surface of the shaft retainer. The outer end 106b of the torsion spring 106 is attached to the sensor housing 100 by means of a coupling bracket 95. Coupling bracket 95 is attached to an inner surface of sensor housing 100 by conventional means such as a threaded coupling pin which is not shown in the figure for simplicity. Coupling bracket 95 is in the general shape of the letter "E" and includes first and second spaced recesses 95a and 95b. Each of the first and second spaced recesses 95a, 95b is adapted to receive and securely engage the outer end 106b of torsion spring 106. Coupling bracket 95 and the two recesses 95a and 95b disposed therein allow the outer end 106b of the torsion spring 106 to be positioned in accordance with the amount of tension to be applied to the torsion spring. For example, with torsion spring 106 applying a rotational force to the sensor arm 72 about it pivot axis aligned with rotating shaft 92, this rotational force, and thus the downward force with which the distal end of the sensor arm 72 engages the ground or plant material disposed on the ground, may be adjusted, as desired. By positioning the outer end 106b of torsion spring 106 in the second, lower recess 95b within coupling bracket 95, the torsion spring may be maintained under increased tension for urging the distal end of the sensor arm 72 downward with greater force. On the other hand, by positioning the outer end 106b of torsion spring 106 within the first, upper recess 95a of coupling bracket 95, torsion spring 106 will be maintained under a reduced tension and will thus exert a reduced downward force on the distal end of sensor arm 72. In this manner, the force with which the distal end of sensor arm 72 engages the ground or plant material disposed on the ground may be adjusted as desired to permit the sensor arm to penetrate a range of thicknesses of plant material disposed on the ground. While the figures show the coupling bracket 95 as having only two adjustment positions, coupling bracket 95 may be sized and configured to include a large number of tension adjustment positions to permit the torsion spring 106 to apply a wide range of the ground-engaging force to sensor arm 72.

As shown in FIG. 4, a sensor guard, or shielding plate, 124 is disposed adjacent the height sensor arrangement 70. Shielding plate 124 is attached to the header crop divider 120 by means of one or more threaded mounting pins 126. Shielding plate 124 is preferably comprised of a high strength, impact resistant material such as metal or plastic and protects the height sensor arrangement 70 from damage caused by impact with plant matter/crop residue as well as with obstructions in the field such as rocks.

Figure 6:
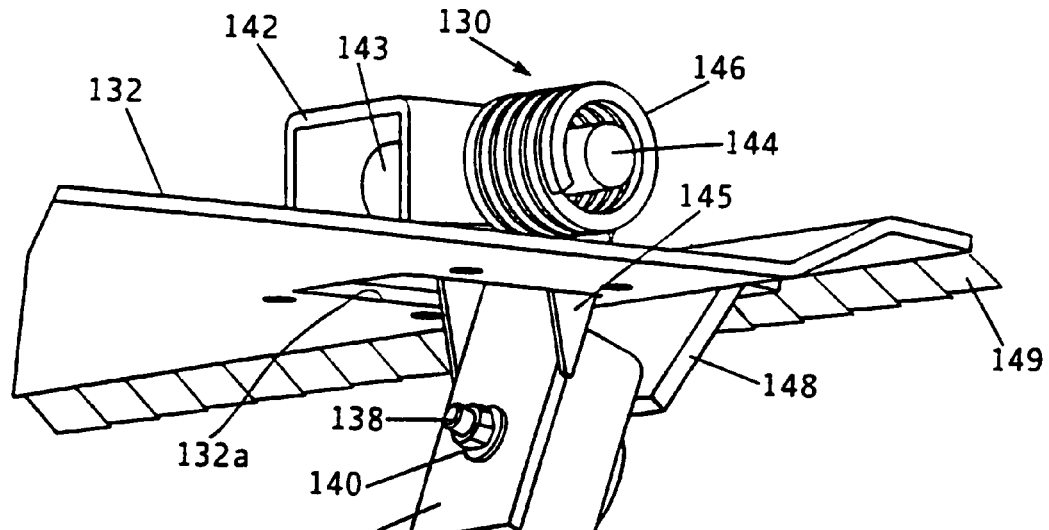
FIG. 6 is a partial perspective view of the embodiment of the height sensor shown in FIG. 2 illustrating additional details of the manner in which it is mounted in the header.

Referring to FIG. 6, there is shown a partial perspective view of another embodiment of a height sensor arrangement 130 in accordance with the present invention. The height sensor arrangement 130 shown in FIG. 6 is adapted for attachment to the skid plate 62 of a header 50 adjacent the header's cutter bar 149 such as illustrated in FIG. 2. In the embodiment shown in FIG. 6, the height sensor arrangement 130 is attached to the header skid plate 62 adjacent to, and extends through, an aperture 132a within the plate. The height sensor arrangement 130 includes a sensor housing 142 attached to an upper surface of the header skid plate 132 by means of plural threaded connectors. Disposed within and extending through facing apertures in opposed surfaces of the sensor housing 142 is a shaft retainer 143. Shaft retainer 143 is freely rotatable within the sensor housing 142 and is connected at one of its ends to a rotating shaft 144 as in the previously described embodiment. In the embodiment shown in FIG. 6, rotating shaft 144 is disposed within and extends through a torsion spring 146. One end of the torsion spring 146 is securely attached to either sensor housing 142 or skid plate 132, while a second end of the torsion spring is connected to the rotating shaft 144. A rotation sensor is also connected to the rotating shaft 144, although this is not shown in the figure for simplicity. Also attached to the rotating shaft 144 so as to rotate therewith is a coupling bracket 145. Coupling bracket 145 includes a generally flat mounting plate 136 to which is attached one end of a sensor arm 134 by means of the combination of a threaded pin 138 and nut 140. A combination of the coupling bracket 145 and mounting plate 136 extends through the aperture 132a within the header skid plate 132. As sensor arm 134 is deflected and displaced upon impact with the soil in the direction of arrow 150, the combination of the rotating shaft 144, coupling bracket 145 and mounting plate 136 rotates about a generally horizontal axis passing through the rotating shaft. The rotation sensor (not shown) coupled to the rotating shaft 144 detects rotation of the sensor arm 134 and provides an appropriate signal for controlling the height of the header above the soil. A sensor guard 148 in the form of a generally flat, high strength plate such as of steel or plastic is attached by conventional means such as weldments or threaded connecting pins to a lower surface of the header skid plate 132 for protecting the height sensor arrangement 130 from damage caused by impact with the soil.

Figure 7:
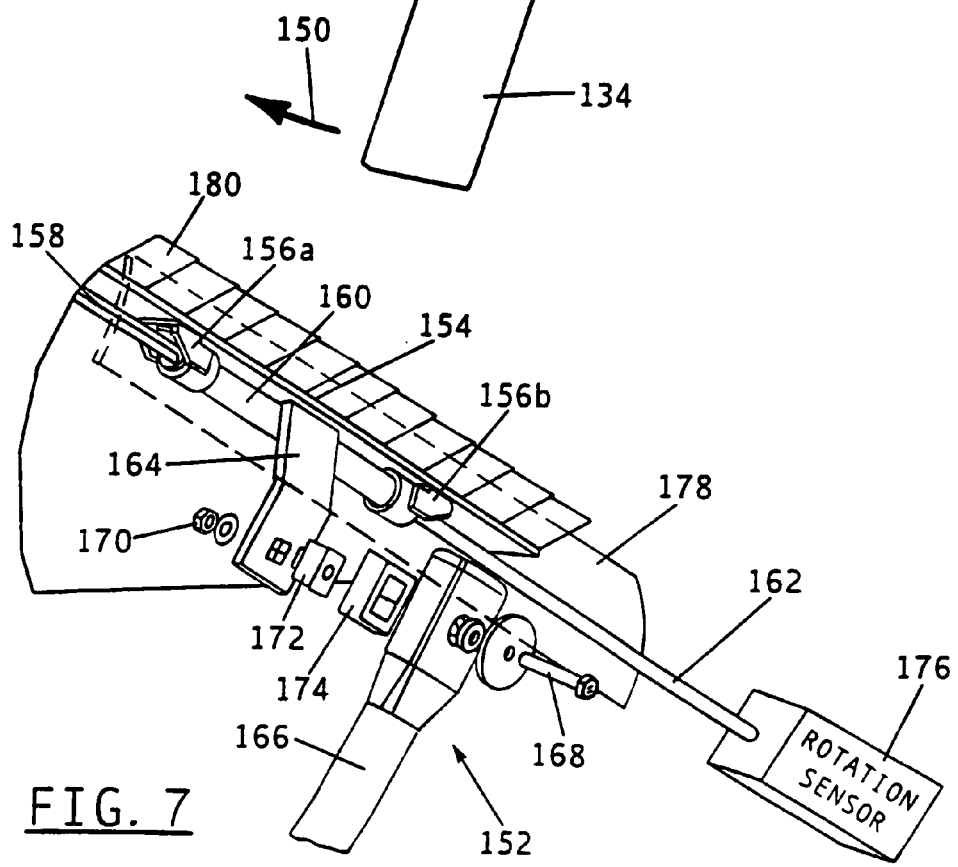
FIG. 7 is a perspective view of another embodiment of a height sensor in accordance with the principles of the present inventions.

Referring to FIG. 7, there is shown another embodiment of a height sensor arrangement 152 in accordance with the principles of the present invention. As in the previously described embodiment, the height sensor arrangement 152 shown in FIG. 7 is adapted for attachment to the lower, leading edge or surface of a header skid plate 154 adjacent the header's cutter bar 180. In the arrangement of FIG. 7, the upper end of a sensor arm 166 is attached to a coupling bracket 164 by means of the combination of an elastomeric bushing 174, an insert member 172, and a threaded pin 168 and nut 170 combination. Coupling bracket 164 is also attached to a cylindrical shaft coupler 160 by conventional means such as weldments, which are not shown in the figure for simplicity. First and second ends of the shaft coupler 160 are securely attached to a lower surface of the header skid plate 154 by means of first and second mounting brackets 156a and 156b, respectively. Shaft coupler 160 is rotatably attached to each of the first and second mounting brackets 156a, 156b, allowing the combination of coupling bracket 164 and sensor arm 166 attached thereto to freely rotate with respect to the header. A first end of the shaft coupler 160 is attached to a torsion bar 158, which is shown as having six sides, while a second opposed end of the shaft coupler is attached to a rotating shaft 162. The other end of the torsion bar 158 is fixedly attached to the header in a conventional manner such that the attached end of the torsion bar is not free to rotate about its longitudinal axis. The other end of the rotating shaft 162 is attached to a rotation sensor 176 which measures the extent of rotation of the shaft and sensor arm 166 attached thereto as in the previously described embodiments. Rotating shaft 162 may be rigid or it may be in the form of a flexible steel cable to facilitate mounting of the rotation sensor 176 on the header. Torsion bar 158 maintains the sensor arm 166 at a given inclination relative to the header and exerts a rotational force on the sensor arm which must be overcome prior to rotation of the sensor as it contacts the soil. The force applied to the sensor arm 166 by the torsion bar 158 maintains a distal end of sensor arm 166 in contact with the soil. An elongated, curvilinear shield 178 is shown in dotted line form mounted to a forward portion of the header to protect the height sensor arrangement from damage caused by impact with the crop or with obstructions in the field. Height sensor arrangement 152 incorporating the rigid, elongated torsion bar 158 may also provide for varying the downward force applied to the sensor arm 156 as in the previously described embodiment. For example, torsion bar 158 may be in the form of a six sided shaft as shown in FIG. 7 which is maintained in position by a mounting bracket (not shown) at least partially disposed about the torsion bar and attached to the header skid plate 154 by plural mounting pins (also not shown). Plural threaded apertures may be provided along the length of the mounting bracket, with each aperture adapted to receive a threaded pin which engages one of the lateral surfaces of the torsion bar 158. With the lower end of the sensor arm 166 engaging the ground, torsion bar 158 may be rotationally displaced so that the desired amount of downward force is applied to the sensor arm. The rotational position of the torsion bar 158 may then be locked in position by tightening the threaded pins engaging lateral surfaces of the torsion bar 158 and preventing it from rotating for maintaining the desired downward force on the sensor arm 166. Although this arrangement is not shown in the figures, it could easily be implemented by one skilled in the relevant arts.

Referring to FIGS. 8-12, the operation of the sensor arm 190 of the present invention will now be described. Sensor arm 192 includes first, second and third sections 192a, 192b and 192c. The first and second sections 192a, 192b are securely connected together by plural connecting pins 206, while the second and third sections of the sensor arm 192 are securely connected together by means of second plural connecting pins 208. A lower distal end of the sensor arm 192 is provided with a bulbous portion 204 for engaging the soil 210. Sensor arm 192 further includes a high strength plastic rod 200 and a metal reinforcing member 202 as in the previously described embodiments. Metal reinforcing member 202 is connected to and extends from a rotation sensor 194. The sensor arm's first section 192a is connected to the metal reinforcing member by means of a threaded connecting pin 96. The high strength plastic rod 200 is also connected to the metal reinforcing member 202 by conventional means and to the three sections of the sensor arm 192 by the first and second plural connecting pins 206 and 208 which draw adjacent portions of the arm together with the plastic rod between them in a clamping manner. Sensor arm 190 is first provided with a predetermined curvature as shown in the various figures.

Figure 8:
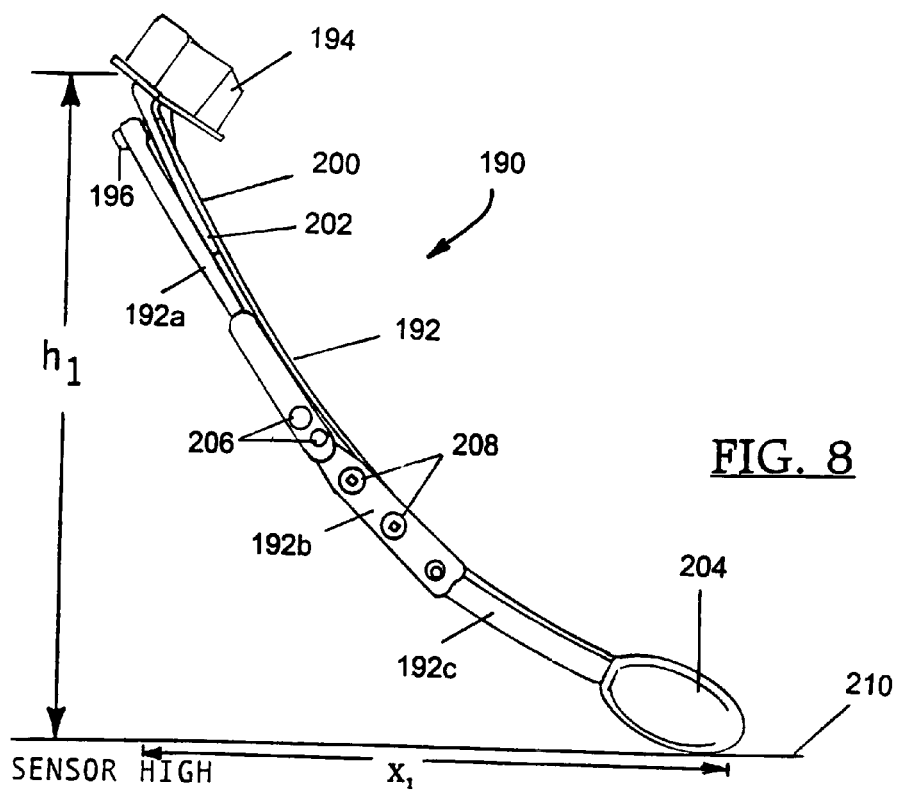
FIGS. 8-12 are side elevation views of another embodiment of the height sensor of the present invention illustrating the manner in which the point of contact of the sensor arm moves forward along the length of the arm in the direction of travel as the separation between the sensor and the soil is reduced.
Figure 9:
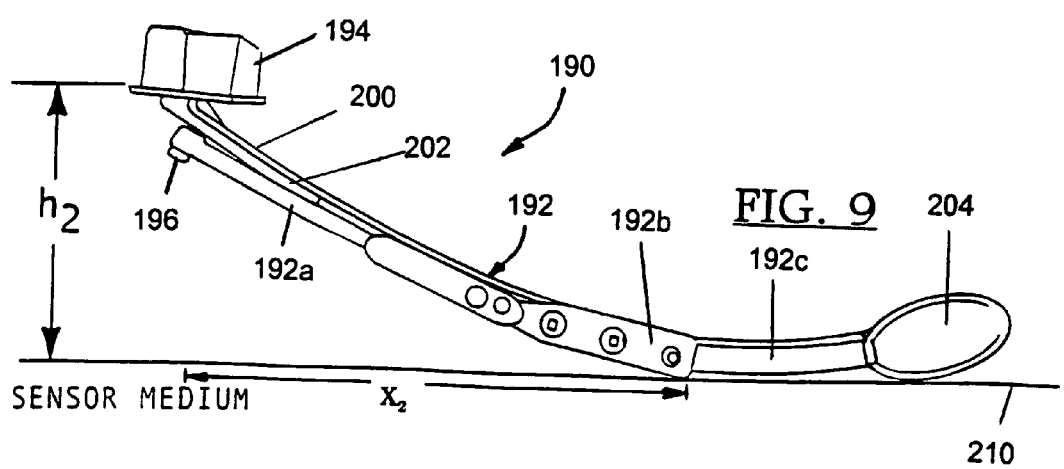
Figure 10:
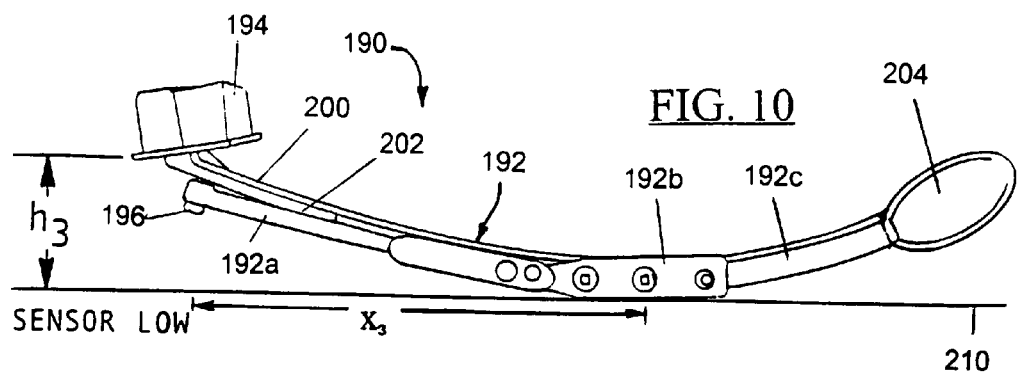
Figure 11:
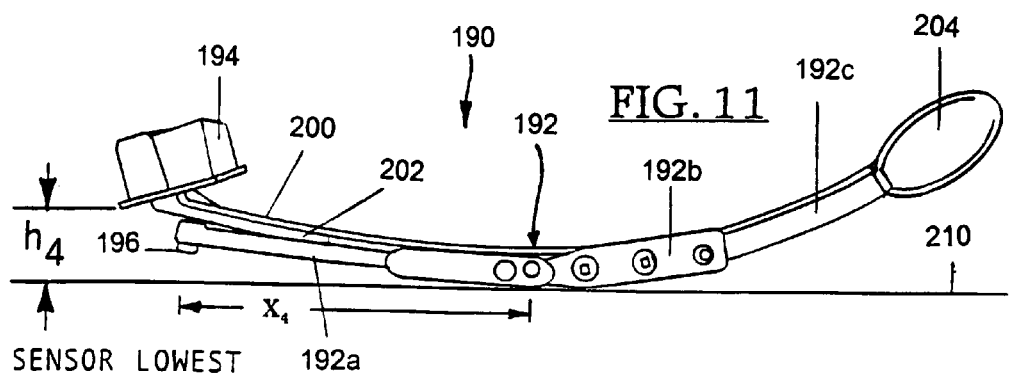

In FIG. 8, the height sensor arrangement 190 is shown in an elevated position, where the distance between the rotation sensor 194 (and the header to which it is attached), is shown as $h_1$. At this height, the bulbous portion 204 of the sensor arm 192 engages the soil 210 a distance $x_1$ aft of the rotation sensor 194, where the combine is moving in a direction from right to left as viewed in FIGS. 8-12. FIG. 9 is a side elevation view of the height sensor arrangement 190 at a medium height, where the distance between the rotation sensor 194 and the soil 210 is $h_2$. At this lower height, an intermediate portion of the sensor arm 192 engages the soil a distance $x_2$ aft of the rotation sensor 194, where $x_2<x_1$. FIG. 10 shows the height sensor arrangement 190 at a lower elevation relative to the soil 210, where the distance between the rotation sensor 194 and the soil is $h_3$. In the lower position of FIG. 10, the curved sensor arm 192 engages the soil adjacent the center of the sensor arm at a distance $x_3$ aft of the rotation sensor 194, where $x_3<x_2<x_1$. FIG. 11 is a side elevation view of the height sensor arrangement 190 at an even lower position relative to the soil 210. At this height, the sensor arm 192 engages the soil at a location close to the proximal end of the arm and in closely spaced relation from the rotation sensor 194. At the reduced height of the rotation sensor 194 shown in FIG. 11, the point of contact of the sensor arm 192 with the soil is $x_4$ aft of the rotation sensor, where $x_4<x_3<x_2<x_1$. From FIGS. 8-11, it can be seen that as the height of the rotation sensor 194 (and thus the height of the header) is reduced, the point of contact of the sensor arm 192 moves forward in the direction of travel of the combine to provide an earlier warning of upraised portions of the soil to facilitate raising the header and avoiding contact with the soil and reducing the possibility of damaging the header.

Figure 12:
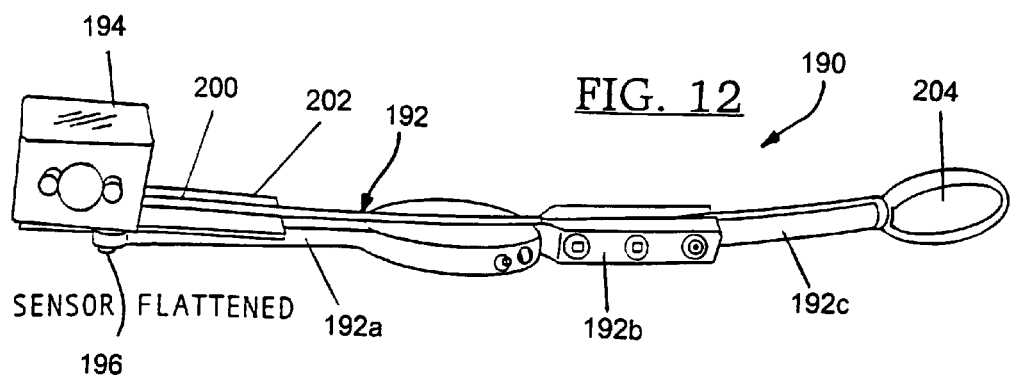

FIG. 12 is a side elevation view of the height sensor arrangement 190, with the rotation sensor 194 in contact with the soil and the sensor arm in a substantially linear configuration. The header and height sensor arrangement would not be operated as shown in FIG. 12, but this figure illustrates the high strength and flexibility of the sensor arm 192 which allows for contact of a lower portion of the header with the soil so as to position the sensor arm in contact with the soil along a substantial portion of its length without damaging or breaking the sensor arm. In addition, the substantially flat configuration assumed by the sensor arm 192 when in substantially full contact with the soil without damage to the sensor arm eliminates the requirement for a recess in the lower surface of the header to receive the sensor arm when the header is in contact with the soil as in some current headers.

Referring to FIG. 13, there is shown a perspective view of a height sensor arm 222 in accordance with another aspect of the present invention. Height sensor arm 222 includes a proximal mounting end 224, a distal ground-engaging end 228 and a curved shaft portion disposed between and formed integrally with the proximal and distal end portions. Height sensor arm 222 has a curved configuration and is concave in an upward direction when installed on an agricultural vehicle such as a harvesting machine. The proximal end 224 of the arm includes first and second mounting apertures 230a and 230b and a recessed portion 232. Recessed portion 232 is adapted for mating engagement with a structure attached to or formed integrally with a header (not shown in the figure of simplicity). The first and second mounting apertures 230a, 230b are each adapted to receive a respective nut and bolt combination for securely attaching the height sensor arm 222 to the header. The distal ground-engaging end 228 of the arm is curvilinear in shape and includes an aperture 236 extending theretbrough. Extending from the aperture 236 to an outer edge of the height sensor arm 222 is a slot 234. Slot 234 is adapted to receive a connecting member 229 for permitting the connecting member to be inserted into aperture 236 for connecting the distal ground-engaging end 228 of the arm to the header. The connecting member 229, an example of which is shown in FIG. 1 as a connecting cable 38, may also be in the form of a rope or chain, preferably comprised of steel, or it may be in the form of high strength strapping such as of nylon. The connecting member 229 prevents possible damage to the height sensor arm 222 in the event the header is reversed in direction. The use of a cable, rope, chain or strapping connected to the height sensor arm's distal end is optional, as the strength, resilience and flexibility of the sensor arm of the present invention has essentially eliminated the need for this type of sensor arm restraining member.

Height sensor arm 222 is comprised of a high strength, flexible material which is highly resilient and thus capable of assuming its original shape and configuration after undergoing substantial deformation or deflection. In a preferred embodiment, height sensor arm 222 is comprised of an elastomer having excellent tensile and tear properties, high stiffness characteristics, good resistance to fuels and oils, and inherent resistance to hydrolysis and the attack of fungi. More specifically, height sensor arm 222 is preferably comprised of a polyether-based thermoplastic polyurethane with a shore hardness of approximately 70D; a specific gravity of 1.18; Taber abrasion resistance of 75; and a Bayshore resilience of 50. A specific example of this type of material is Texin 970U resin (formerly known as 970D). This polyether-based thermoplastic polyurethane is available from Bayer Polymers of Pittsburgh, Pa.

Referring to FIG. 14, there is shown a front view of an agricultural header 240 incorporating first and second sensor arms 256 and 258 in accordance with the principles of the present invention. Header 240 is mounted to the front of a combine, with only wheels 242 and 244 of the combine shown in the figure for simplicity. Header 240 includes a body portion aligned generally transverse to the direction of travel of the combine. Disposed on opposed ends of the header's body portion are first and second header end plates 246a and 246b. Disposed on a forward portion of the header 240 is a cutter bar 248 and a crop gathering unit 250 disposed above the cutter bar. In some headers, such as those used in the harvesting of wheat, a generally flat skid plate 252 is disposed below the cutter bar 248 and forms the bottom of the header 240. Disposed adjacent the cutter bar 248 and extending between the header's first and second end plates 246a, 246b is a cross member 254. Attached to the cross member 254 adjacent its opposed ends are first and second mounting plates 260 and 262. Respectively attached to the first and second mounting plates 260, 262 are first and second coupling brackets 264 and 266. Respectively attached to the first and second coupling brackets 264, 266 are the first and second sensor arms 256 and 258. Conventional nut and bolt combinations are used for attaching the first and second mounting plates 260, 262 to the cross member 254, as well as for securely attaching the first and second coupling brackets 264, 266 to the first and second mounting plates 260, 262, respectively. As previously described, the first and second sensor arms 256, 258 respectively include proximal mounting ends 256a and 258a disposed at the upper end of the sensor arm. The proximal mounting ends 256a, 258a of the first and second sensor arms 256, 258 are respectively attached to the first and second coupling brackets 264 and 266 by conventional means such as nut and bolt combinations. The above-described sensor arm mounting and installation arrangement is provided for illustration purposes, as the sensor arm of the present invention may be installed using various mounting arrangements. For example, the inventive sensor arm may be mounted using conventional connectors to a guard for the crop cutter bar 248 which is not shown in the figures for simplicity. In addition, while the height sensor arm of the present invention is disclosed as mounted to opposed ends of the header, the inventive height sensor arm, or several such sensor arms, may be positioned virtually anywhere along the length of the header. As headers increase in length, more height sensor arms are being installed in a spaced manner along the length of the header.

As the header 240 and combine combination traverses the surface of the soil 270, the first and second sensor arms 256 and 258 contact the soil, as well as any obstructions in or on the soil. For example, the second sensor arm 258 engages the soil, while the first sensor arm 256 is shown in the figure contacting a rock, or boulder, 268 on the soil 270. Impact of the first sensor arm 256 with rock 268 will cause the sensor arm to bend rearwardly and also, in most cases, transversely relative to the direction of travel of the header 240. Transverse deflection of the first sensor arm 256 is shown in FIG. 14. While the first sensor arm 256 is shown engaging a rock 268 in FIG. 14, various other obstructions are commonplace in the soil and typically give rise to rearward and transverse deflection of the sensor arm. In addition to rocks and boulders, these obstructions include roots, ruts, terraces, etc. The flexible and resilient characteristics of the sensor arm of the present invention allow it to be deflected transversely and to immediately assume its original shape and configuration once the obstruction is passed. Thus, a sensor arm in accordance with the present invention is capable of providing accurate height sensing information immediately after being deflected in any direction by an obstruction in or on the soil. Current sensing arms comprised of, or incorporating, a high strength metal such as steel, either in the form of a straight or curved elongated arm, are not designed for lateral bending and are thus subject to permanent deformation or breakage upon impact with an obstruction in the soil causing lateral deflection of the sensor arm.

Figure 15:
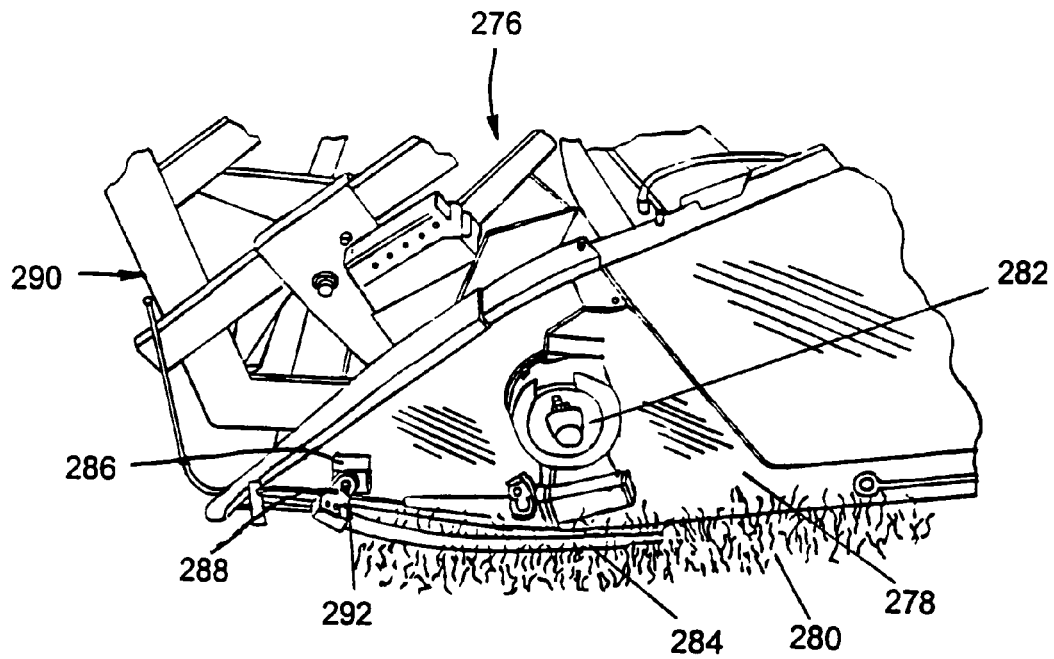
FIG. 15 is a side perspective view of a combine header incorporating a height sensor arm in accordance with the present invention, where the header and sensor arm are shown lowered to the ground with the sensor arm assuming a generally linear configuration.

Referring to FIG. 15, there is shown a side perspective view of a header 276 incorporating a height sensor arm 284 in accordance with the principles of the present invention. As in the previously described header, header 276 includes a crop gathering unit 290 on a forward portion of the header. Header 276 also includes a pair of end panels, where one of the end panels is shown as element 278 in FIG. 15. Attached to end panel 278 is a sickle drive mechanism 282 which drives the aforementioned cutter bar. Also attached to the header end panel 278 is a mounting bracket 286. Extending through the mounting bracket 286 is a rotating shaft 292 to which is attached by conventional means a coupling bracket 288. Height sensor arm 284 is attached to coupling bracket 288 by conventional means such as nut and bolt combinations. The combination of coupling bracket 288 and height sensor arm 284 causes rotation of shaft 292 with deflection of the height sensor arm as it traverses a field. Rotational displacement of shaft 282 gives rise to signals representing the height of the header 276 above the surface of the soil.

As shown in FIG. 15, head 276 has been lowered so that it rests upon and engages the soil 280. In this position, height sensor arm 284 has been fully deflected in a counter-clockwise direction about the axis of rotating shaft 292 as viewed in FIG. 15. When fully deflected, height sensor arm 284 assumes a generally linear configuration as it engages and rests upon the soil 280. The flexibility of the height sensor arm 284 allows it to change its shape and assume a generally flattened configuration as shown in FIG. 15 while still being capable of assuming its initial curved configuration upon removal of the distorting force applied to the height sensor arm. In some header installations, the height sensor arm 284 may be located between the header's end panels and disposed forward of and below the generally flat skid plate located on a lower portion of the header. This is the case for height sensor arms 256 and 258 relative to skid plate 252 as previously described with respect to FIG. 14. When the sensor arm is positioned as shown in FIG. 14, lowering of the header to a position where its skid plate is closely spaced from or engages the soil will also force the height sensor arm into intimate contact with the soil substantially along its entire length such as shown in FIG. 15. With height sensor arm 284 located beneath the header's skid plate, lowering of the header to a position wherein it rests upon and engages the soil causes the sensor arm to also engage the header's lower skid plate. In the case of prior height sensor arms comprised of or incorporating an elongated steel member, this results in permanent deformation or breakage of the height sensor arm. However, the strength and flexibility of the height sensor arm of the present invention allows it to be positioned between and in contact with the soil and the header's lower skid plate and to assume a generally linear configuration without breaking or damaging the height sensor arm which will assume its original curved shape and configuration when the header is elevated to a position above the soil.

Figure 16:
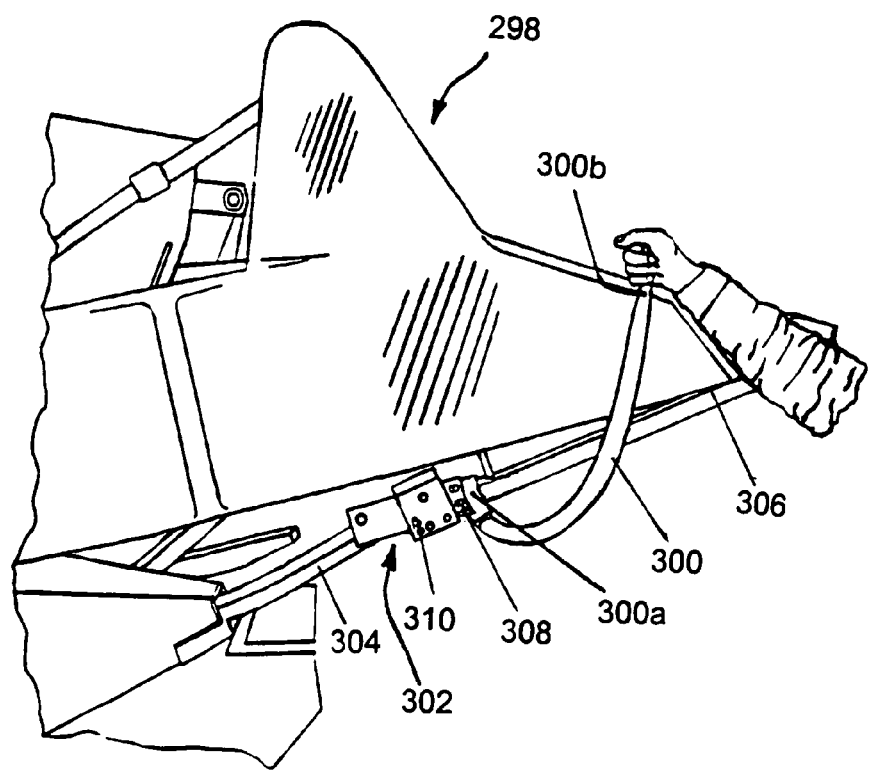
FIG. 16 is a side elevation view of a height sensor arm mounted to a agricultural header in accordance with the present invention, where the sensor arm is shown bent in an upward direction by a person grasping and raising the distal end of the sensor arm.

Referring to FIG. 16, there is shown another installation of a height sensor arm 300 in accordance with the present invention in a header incorporating an end panel 298. Height sensor arm 300 includes a proximal mounting end 300a and a distal ground-engaging end 300b. Mounting hardware for attaching the height sensor arm 300 to a lower portion of the header end panel 298 includes first and second structural members 304 and 306 and a sensor support structure 302. The first and second structural members 304 and 306 are attached to and suspended from the header end panel 298 by various attachment brackets as is conventional. The arm's proximal mounting end 300a is attached to a coupling bracket 308 which, in turn, is attached to a mounting bracket 310. Conventional means such as nut and bolt combinations are used for attaching the height sensor arm 300 to coupling bracket 308 and for affixing the coupling bracket to mounting bracket 310. As in the previously described embodiment, coupling bracket 308 is attached to a rotating shaft which provides rotational displacement signals to a detector (not shown for simplicity) representing rotational displacement of the height sensor arm 300 as it engages and traverses the soil. The flexibility and resilience of height sensor arm 300 allows it to be bent in a direction opposite to its curvature into the upwardly extended configuration shown in FIG. 16 as it is grasped and pulled upwardly by a person. The sensor arm's resiliency allows it to assume its original configuration and shape wherein it extends downwardly and rearwardly from coupling bracket 308 and assumes an upwardly concave curvature when released from its upwardly bent configuration shown in FIG. 16. The change in configuration and shape that height sensor arm 300 undergoes by firmly grasping and lifting the arm's distal end 300b, as shown in FIG. 16, is not likely a change which the arm would undergo in an operating environment, but it is similar to deflection of the arm which occurs when the agricultural implement to which the arm is mounted is reversed in direction. In this case, the sensor arm engaging the soil is bent backward and undergoes considerable deformation and distortion. The height sensor arm 300 shown in FIG. 16 is undergoing even greater deformation and distortion than that encountered by a sensor arm in an implement moving in reverse and is still capable of assuming its original shape and configuration to provide reliable and accurate implement height information when moving in a forward direction.

Figure 17:
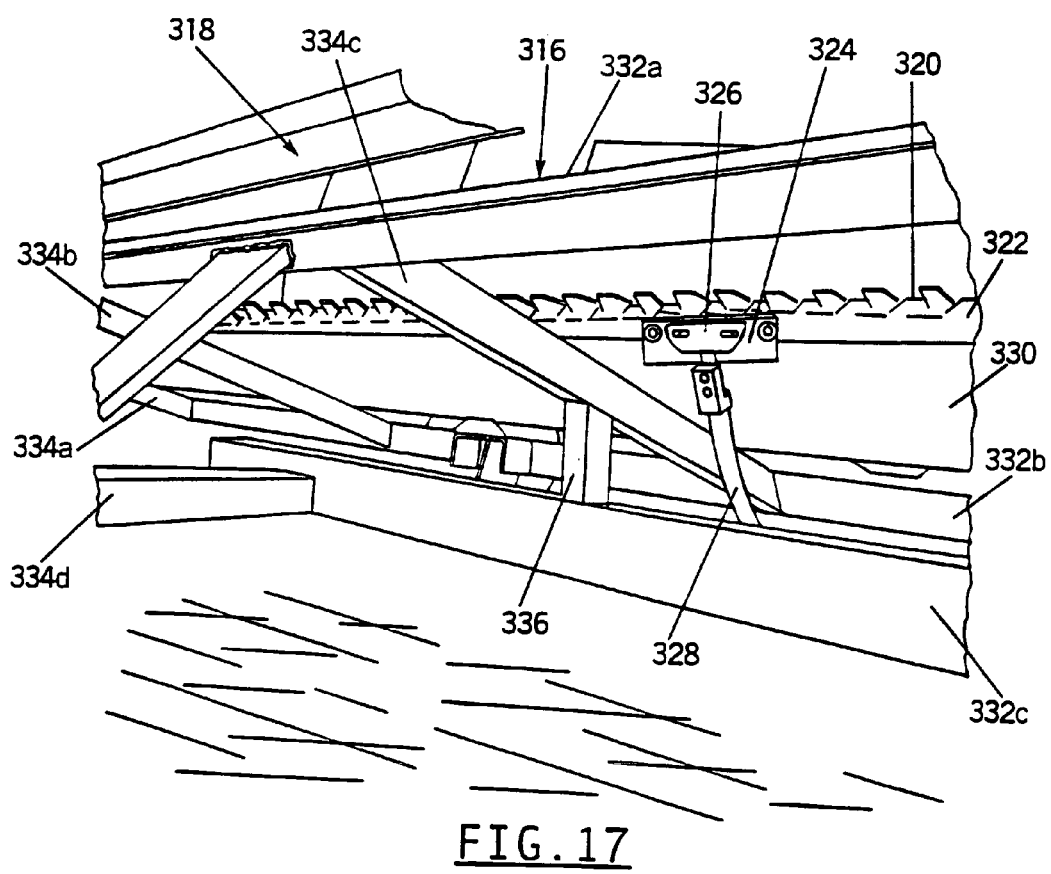
FIG. 17 is a partial perspective view of an agricultural header incorporating a height sensor arm in accordance with the present invention, where the header is shown positioned on a cart or trailer for header transport.

Referring to FIG. 17, there is shown a partial perspective view of a trailer 316 adapted for supporting and transporting a header 318. As previously described, header 318 includes a cutter bar 320 and a skid plate 330 extending rearwardly from the cutter bar. Skid plate 330 forms a lower portion of the header 318. Header 318 further includes a cross member 322 to which is attached a mounting plate 324 by conventional means such as nut and bolt combinations. A coupling bracket 326 is attached to the mounting plate 324 and is further connected to an upper end portion of a height sensor arm 328 in accordance with the present invention.

Header trailer 316 includes various structural members including first, second and third transverse structural members 332a, 332b and 332c. Header trailer 316 further includes various longitudinal structural members which are aligned along the direction of travel of the trailer. These latter structural members includes first, second, third and fourth longitudinal structural members 334a-334d. The various transverse and longitudinal structural members are connected together by weldments and/or other structural members, such as vertical structural member 336 connecting the third transverse structural member 332c and the third longitudinal structural member 334c.

As shown in FIG. 17, the curved, flexible, resilient height sensor arm 328 of the present invention engages the third transverse structural member 332c as it is being loaded onto the header trailer 316. Contact between height sensor arm 328 and the third transverse structural member 332c causes substantial bending and deformation of the sensor arm. Removal of header 318 from trailer 316 may also cause substantial bending and deformation of height sensor arms attached to and suspended from the header if the arm catches on a portion of the trailer. In the case of prior height sensor arms comprised of or incorporating a high strength steel member, positioning the header on and removal of a header from its trailer can frequently result in permanent deformation or breakage of the header's height sensor arms. However, the high strength, flexibility and resilience of the height sensor arm of the present invention allows it to bend over virtually any deflection angle upon contact with the trailer when positioning the header on or removing the header from the trailer without either breakage or permanent deformation of the height sensor arm.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for use in an agricultural implement for measuring the height of said agricultural implement above the soil as said agricultural implement traverses a field, said apparatus comprising:

a shaft mounted to the agricultural implement;

rotation sensing means coupled to said shaft and responsive to rotation of said shaft for providing an output signal representing rotational displacement of said shaft; and a one piece, elongated, curved, flexible member formed entirely of an elastomeric material having a proximal end connected to said shaft and a distal end engaging the soil, wherein said elongated member is bendable in any direction and capable of assuming its original shape and configuration following bending and said elongated member is concave in an upward direction and rotates in a first direction when said arm contacts upraised soil and rotates in a second opposed direction when said arm contacts a depression in the soil.

2. The apparatus of claim 1 wherein said elastomeric material is polyurethane.

3. The apparatus of claim 2 wherein said elastomeric material is thermoplastic polyurethane.

4. The apparatus of claim 3 wherein said elastomeric material is polyether-based thermoplastic polyurethane.

5. The apparatus of claim 4 wherein said elastomeric material is Texin thermoplastic polyurethane resin.

6. The apparatus of claim 1 further comprising an attachment arrangement disposed on the proximal end of said elongated member for attaching said elongated member to said shaft.

7. The apparatus of claim 6 wherein said attachment arrangement includes an aperture or slot extending through said elongated member for receiving a connecting member.

8. The apparatus of claim 7 wherein said connecting member is flexible.

9. The apparatus of claim 8 wherein said flexible connecting member is a cable, rope, chain or strap.

* * * * *